US006758096B1

(12) United States Patent
Schön et al.

(10) Patent No.: US 6,758,096 B1
(45) Date of Patent: Jul. 6, 2004

(54) METHOD FOR MONITORING THE GAS PREFILL PRESSURE IN HYDRAULIC ACCUMULATORS

(75) Inventors: Otmar Schön, Bexbach (DE); Klaus Goebbels, St. Ingbert (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 0 days.

(21) Appl. No.: 09/958,958

(22) PCT Filed: Mar. 25, 2000

(86) PCT No.: PCT/EP00/02648

§ 371 (c)(1),
(2), (4) Date: Dec. 19, 2001

(87) PCT Pub. No.: WO00/63562

PCT Pub. Date: Oct. 26, 2000

(30) Foreign Application Priority Data

Apr. 16, 1999 (DE) ........................................ 199 17 210

(51) Int. Cl.$^{7}$ ................................................ G01L 19/04
(52) U.S. Cl. ......................................................... 73/708
(58) Field of Search .......................... 73/708, 717, 700, 73/723

(56) References Cited

FOREIGN PATENT DOCUMENTS

| | | |
|---|---|---|
| DE | 3224136 | 12/1983 |
| DE | 3609701 | 9/1987 |
| JP | 10296815 | 11/1998 |

OTHER PUBLICATIONS

Prestaties van hydraulische installaties ongemerkt beïnvloed; "Continue bewaking van de hydro–accumulator bespaart gevolgschade", 814 Polytechnisch Tijdschrift Werktuigbouw 47 (1992) Maart, No. 3, Rijswijk, NL by Drs. T van Dale; pp. 38–41.

*Primary Examiner*—Harshad Patel
(74) *Attorney, Agent, or Firm*—Roylance, Abrams, Berdo & Goodman, LLP

(57) ABSTRACT

A method monitors the gas prefill pressure in hydraulic accumulators. After the pressure supply to the oil side of the accumulator has been interrupted and the contents of the tank have been emptied, the current gas temperature and the current gas pressure are determined, once the temperature has equalized. The data relating to the gas temperature and pressure is telemetrically transmitted to an evaluation unit, which is spatially located at a distance, to calculate an actual value of the gas prefill pressure which corresponds to a reference temperature.

10 Claims, 1 Drawing Sheet

METHOD FOR MONITORING THE GAS PREFILL PRESSURE IN HYDRAULIC ACCUMULATORS

FIELD OF THE INVENTION

The present invention relates to a process for monitoring the gas prefill pressure in hydraulic accumulators. The process comprises the steps of interrupting delivery of pressure to the oil side of the accumulator and emptying of the contents into the tank, measuring the gas temperature on the gas side of the hydraulic accumulator, measuring the gas pressure on the gas side of the hydraulic accumulator, and determining an actual value of the gas prefill pressure based on data relating to gas temperature or gas pressure by means of an evaluation device.

BACKGROUND OF THE INVENTION

The operating properties of hydraulic accumulators are determined essentially by the prefill pressure selected. For the sake of perfect and dependable operation of accumulators and accumulator assemblies, monitoring must be carried out in the shorter periods between customary maintenance operations to determine if the constancy of the prefill pressure falls within acceptable variation limits. A monitoring process with the four process steps described above to be carried out for this purpose is conventional (cf. "Controle van hydro-accumulator" of the Dutch article "Continue bewaking van de hydro-accumulator bespaart veel volgschade" by T. Van Dale in "Polytechnisch Tijdschrift," pp. 38–41, March 1992).

If the conventional process is performed as customary, protracted interruptions of operation and major difficulties arise, especially in cases in which a large number of accumulators are spatially mounted separate from each other in locations in large plants which are difficult to access.

SUMMARY OF THE INVENTION

Objects of the present invention are to provide a process which permits substantially simplified monitoring of hydraulic accumulators with a high degree of monitoring precision, even accumulators mounted in locations difficult to access.

In the process of the present invention, these objects are attained by measurement of the gas temperature and gas pressure up to the time of temperature equalization reached after emptying and telemetric transmission of data relating to gas temperature or gas pressure to a spatially remote evaluation device.

As a result of the telemetric data transmission of the present invention, a system is created allowing monitoring of the prefill pressure from a central measuring station in the shortest possible time and with the lowest possible personnel cost. The process of the present invention makes rapid and simple monitoring possible even in cases in which accumulators are difficult to access inside complex plants. Advantageous areas of application are accumulators and accumulator assemblies in iron and steel plants and rolling mills, in electric power generating plants, or, for example, machinery rooms with several machine assemblies. Simplification of monitoring makes it possible to carry out the monitoring processes in short periods of time, something of particular advantage if the hydraulic accumulators perform security functions. Additionally, the desirable high degree of monitoring precision is assured because data transmission takes into account the reaching of temperature equalization after emptying of the accumulator.

Telemetric data transmission may be effected by radio, instrument leads, via the telephone network, for example, or over the electric power supply grid by application of suitable modulation processes.

By preference, temperature values and pressure values generated by transducers coordinated with the thermometers and the pressure gauges on the manometer connection of the hydraulic accumulator are transmitted to a modem, one of which is provided on every hydraulic accumulator to be monitored. The temperature value and pressure value signals preferably are transmitted telemetrically by way of the modem of the hydraulic accumulator involved, without further processing, directly to the evaluation unit. On the evaluation unit, the appropriate computer program is run to calculate the actual gas prefill pressure corresponding to a reference temperature from the current temperature and pressure values. Alternatively, this calculation can be carried out at the hydraulic accumulator by an additional computer unit associated with a modem. Then, only the actual value of the gas prefill pressure is transmitted to the evaluation unit for subsequent presentation, for example, as a visual display, and/or for sounding an alarm or the like.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
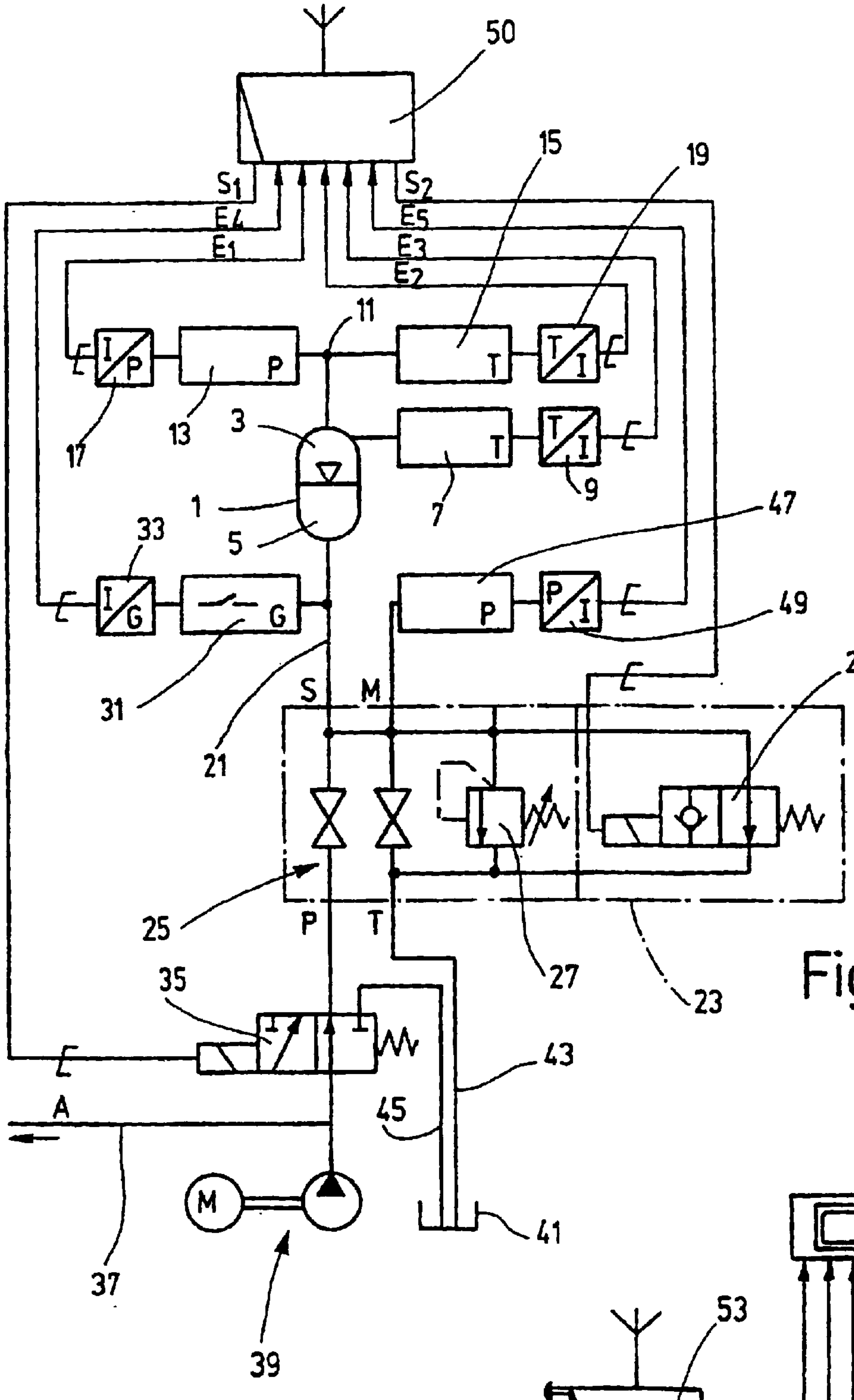
FIG. 1 is a schematic diagram of a hydraulic accumulator according to the present invention in conjunction with an accompanying evaluation unit.

FIG. 1 shows a hydraulic accumulator 1 in the form of a bubble accumulator with a gas side 3 and an oil side 5. The process or method of the present invention can also be carried out in basically the same way with a diaphragm accumulator or piston accumulator. To measure the gas temperature inside the gas side 3 of the hydraulic accumulator 1, a thermometer 7, with accompanying transducer 9 for conversion of the temperature values to electric measurement values, is directly connected to the accumulator. A line leads from the gas side 3 of the hydraulic accumulator 1 to a manometer connection 11 coupled to both a manometer 13 and a second thermometer 15. Manometer 13 and thermometer 15 have accompanying transducers 17 and 19, respectively, for conversion of measured values to corresponding electric measurement signals.

A line 21 connects the oil side 5 of the hydraulic accumulator 1 to a safety and shut-off group 23 forming the connection between the accumulator connection S on the line 21 and the pressure connection P and the tank connection T. In addition to the customary primary shut-off unit 25, the safety and shut-off group 23 has a pressure limit valve 27 and an electromagnetically controllable two-way valve 29, which permits connection of the oil side 5 of the hydraulic accumulator 1 through line 21 and the accumulator connection S to the tank connection T of the safety and shut-off group 23, if the oil valve (not shown) on hydraulic accumulator 1 is in an open state. A monitoring device for monitoring the open position or closed position of this oil valve preferably is in the form of a disk valve, is designated in FIG. 1 as 31 and delivers an appropriate monitoring signal by way of a transducer 33.

The pressure connection P of the safety and shut-off group 23 is connected by an electromagnetically operated distributing valve 35 to the consumer line 37, to which a motor and pump unit 39 is connected. Lines 43 and 45 lead from the tank connection of the safety and shut-off group 23 and from the distributing valve 35 to the tank 41, respectively. A pressure gauge 47 for measurement of the pressure on the oil side 5 of the hydraulic accumulator 1 is connected to the manometer connection M of the safety and shut-off group 23 and has a transducer 49 for generation of an appropriate electric test signal.

Figure 2:
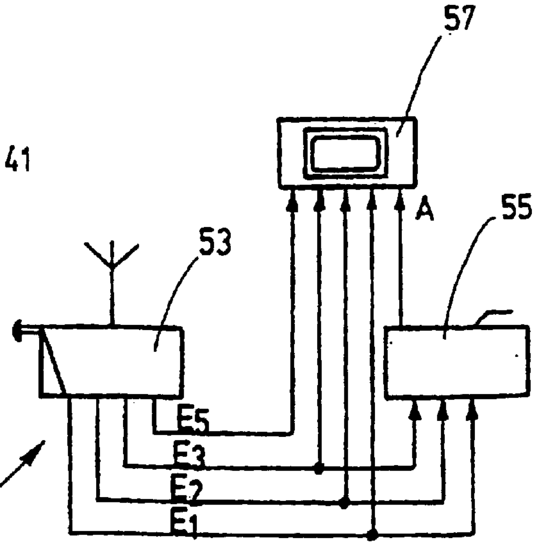
FIG. 2 is a block diagram of an evaluation unit for application of the process according to the present invention.

The test signals of the transducers 9, 17, 19, and 49, and the monitoring signal of the transducer 33 are delivered to a modem 50, which forms part of a telemetry device. The telemetry device transmits the data to an evaluation device 51 illustrated in FIG. 2 and from the evaluation device 51 to the modem 50. The evaluation device 51 contains a modem 53, a computer unit 55, and a display unit 57. Depending on whether data transmission takes place over a line or is wireless, the modems 50 and 53 have the modulation-demodulation systems suitable for the particular transmission process involved and, optionally, transceiving devices known from conventional telemetry systems.

For the purpose of initiating a measurement process, the modem 50 receives by telemetry a control command causing modem 50 to emit control signals $S_1$ and $S_2$ to the electromagnets of the distributing valve 35 and to the electromagnets of the distributing valve 29 to interrupt delivery under pressure to the oil side 5 of the hydraulic accumulator 1 and to empty the accumulator over line 21 through the distributing valve 29 into the tank 41. Temperature and pressure measurements are made on the gas side if emptying has been completed, a situation indicated by the manometer 47 detecting absence of pressure and sending a signal announcing that fact as signal $E_5$ by way of the transducer 49. At the same time, the monitoring device 31 sends by way of the transducer the monitoring signal $E_4$ indicating that the previously open oil valve on the hydraulic accumulator 1 is now closed. In order to determine when temperature equalization has occurred on the gas side 3 of the hydraulic accumulator 1, that is, when the temperature changes resulting from the process of emptying the accumulator have been offset, temperature measurements are made simultaneously both by the thermometer 7 directly on the gas side 3 and by the thermometer 15 spatially remote from it at the manometer connection 11, until equalization is signaled by test signals $E_3$ and $E_2$ generated by the coordinated transducers 9 and 19 as a result of coincidence of the test values. When this state is reached, the current gas pressure is simultaneously determined by the manometer 13 via manometer connection 11 and is delivered to the modem 50 by way of the pertinent transducer 17 as test signal $E_1$.

The temperature and data values as thus transmitted are delivered by telemetric means to the modem 53 of the evaluating system 51. The computer unit 55 of this system now executes a computer program in order to calculate from these data an actual gas prefill pressure value related to a reference temperature. Such calculation may be carried out with very good approximation as an isochoric ideal gas calculation, for example, in relation to a reference temperature of 20° C., in accordance with the equation $$p_o = \frac{293_p}{T}$$

in which $p_o$=the temperature-referred actual value of the gas prefill pressure in bar, p=the current measured gas pressure in bar, and T=the current temperature in degrees Kelvin.

More particularly, this calculation may be performed by application of the equation of the state for real gases as developed by E. Bender; in this connection, reference is made to S. Rotthäuser, "A Process for Calculation and Investigation of Hydropneumatic Accumulators," a published dissertation defended at the School of Mechanical Engineering of the Aachen University of Technology.

The values calculated by the computer unit 55 of evaluation system 51 as a function of test signals $E_1$, $E_2$, and $E_3$ are delivered as display values A to display unit 57 to be visually displayed. Depending on the application case and need, the display valves are subjected to more detailed analysis and documented, for example, by being printed out.

While one embodiment has been chosen to illustrate the invention, it will be understood by those skilled in the art that various changes and modifications can be made therein without departing from the scope of the invention as defined in the appended claims.

What is claimed is:

1. A process for monitoring gas prefill pressure in hydraulic accumulators, comprising the steps of:

initiating interrupting delivery of pressure to an oil side of a hydraulic accumulator and emptying contents of the oil side into a tank;

measuring gas temperature on a gas side of the hydraulic accumulator when temperature equalization is reached after emptying the contents of the oil side of the accumulator;

measuring gas pressure on the gas side of the hydraulic accumulator;

transmitting the gas and temperature measurements by telemetry to a spatially remote evaluation system as telemetric data; and determining an actual value of gas prefill pressure based on the telemetric data relating to gas temperature and pressure by the evaluation system.

2. A process according to claim 1 wherein the telemetric data is transmitted by radio signals.

3. A process according to claim 1 wherein the telemetric data is transmitted by a measurement transmission line, a telephone line or modulated signals through an electric power supply grid.

4. A process according to claim 1 wherein temperature equalization is determined by comparing the gas temperature in the gas side of the accumulator with temperature at a manometer connection spatially separated from the accumulator at a location where the gas pressure is measured.

5. A process according to claim 4 wherein the temperature measurements are performed by thermometers;

the pressure measurement is performed by a manometer at the manometer connection, and the temperature and pressure measurements are converted by tranducers to temperature and pressure signal valves that are delivered to a modem coupled to the accumulator for transmission to the evaluation system.

6. A process according to claim 5 wherein a verification process is initiated by control signals delivered telemetrically from the evaluation system to the modem.

7. A process according to claim 6 wherein the accumulator is emptied by a safety and shut-off valve group and delivery of pressure to the oil side of the accumulator is interrupted by a valve device, the valve group and valve device being actuated electromagnetically by the control signals transmitted.

8. A process according to claim 7 wherein monitoring signals identify open and closed positions of an accumulator oil valve, and are transmitted to the modem by a transducer coupled to the oil valve.

9. A process according to claim 1 wherein an indicator value characteristic of functional capacity is formed from temperature and pressure data processed in the evaluation system, and is visually displayed.

10. A process according to claim 1 wherein the interrupting of the delivery of pressure to the oil side is initiated at a predetermined time.

* * * * *